United States Patent
Tamai et al.

[11] Patent Number: 6,045,483
[45] Date of Patent: Apr. 4, 2000

[54] CONTROL APPARATUS FOR HYDRAULICALLY OPERATED VEHICULAR TRANSMISSION

[75] Inventors: Masaya Tamai; Yasushi Shimizu; Masaru Yamashita, all of Saitama, Japan

[73] Assignee: Honda Giken Kogyo Kabushiki Kaisha, Tokyo, Japan

[21] Appl. No.: 09/310,978

[22] Filed: May 13, 1999

[30] Foreign Application Priority Data

May 15, 1998 [JP] Japan .................................. 10-133511

[51] Int. Cl.$^7$ ............................. B60K 41/06; F16H 61/26
[52] U.S. Cl. ............................................ 477/140; 475/122
[58] Field of Search ................................... 477/140, 127; 475/121, 122

[56] References Cited

U.S. PATENT DOCUMENTS 3,738,198  6/1973  Kell .......................................... 477/140
4,680,989  7/1987  Sykora et al. ........................... 477/140

FOREIGN PATENT DOCUMENTS 5-27785  4/1993  Japan .

*Primary Examiner*—Sherry L. Estremsky
*Attorney, Agent, or Firm*—Sughrue, Mion, Zinn Macpeak & Seas, PLLC

[57] ABSTRACT

There are respectively provided control valves 15, 16 in hydraulic oil paths L11, L12 for inputting governor pressure PV into shift valves $11_1$, $11_2$, $11_3$. In the control valves 15, 16, there are provided first pressure chambers 15g, 16g pushing the spools 15a, 16a of the control valves 15, 16 onto the closing position side. At position "D$_3$" or "2", hydraulic pressure is inputted into the first pressure chambers 15g, 16g, so that the spools 15a, 16a can be changed over to the closing position, and the input of governor pressure PV into the shift valves $11_1$, $11_2$, $11_3$ is stopped so that the shift valves can be changed over to the low speed position. In the control valves 15, 16, there are provided second pressure chambers 15h, 16h pushing the spools 15a, 16a onto the opening position side, and governor pressure PV is inputted into the second pressure chambers 15h, 16h. In this way, the spools 15a, 16a are not changed over to the closing position while the vehicle is running at high speed.

3 Claims, 3 Drawing Sheets

CONTROL APPARATUS FOR HYDRAULICALLY OPERATED VEHICULAR TRANSMISSION

BACKGROUND OF THE INVENTION

1. Field of the Invention

The present invention relates to a control apparatus of a hydraulically operated vehicular transmission having at least two speed gears including a low speed gear and a high speed gear.

2. Description of the Related Art

This type control apparatus is provided with a shift valve to be freely changed over between a low speed position for establishing a low speed stage and a high speed position for establishing a high speed stage. The shift valve is changed over according to a predetermined speed change characteristic in which an engine load and a vehicle speed are set as parameters, so that automatic gear change can be conducted.

Control apparatuses can be divided into two main classes. One is an electronic control type control apparatus in which a shift valve is changed over by using an electromagnetic valve controlled by a controller into which signals are inputted from an engine load sensor and a vehicle speed sensor. The other is a purely hydraulic type control apparatus which uses a first hydraulic signal output means for outputting a first hydraulic signal according to an engine load and also uses a second hydraulic signal output means for outputting a second hydraulic signal according to a vehicle speed, and a shift valve is changed over onto a low speed position side when the shift valve is pushed according to the first hydraulic signal and an energizing means and also the shift valve is changed over onto a high speed position side when the shift valve is pushed according to the second hydraulic signal. Recently, the electronic control type control apparatus is generally used, however, the purely hydraulic type control apparatus is also used for the reason of reducing the cost.

In this connection, when an operator conducts a down-shift operation, for example, when an operator changes over from an automatic gear changing range to a low speed holding range, it is necessary for him to change over a shift valve to a low speed position so as to conduct a down-shift operation from a high speed gear to a low speed gear. For example, in the purely hydraulic type control apparatus shown in Japanese Examined Patent Publication No. 5-27785, a valve section arranged in a hydraulic oil path for inputting the second hydraulic signal into the shift valve is formed into a manually operated valve. Here, the above hydraulic oil path is opened in the automatic gear changing range, however, the hydraulic oil path is shut off by the valve section in the low speed holding range, so that the input of the second hydraulic signal into the shift valve can be stopped.

In the above purely hydraulic type control apparatus of the related art, when a driver conducts down-shift operation and a vehicle speed at that time is higher than that corresponding to the down-shifted gear, an engine overruns. In order to prevent the engine from overrunning, it is necessary to provide another hydraulic circuit or an electronic control type prevention device.

SUMMARY OF THE INVENTION

In view of the above circumstances, it is an object of the present invention to provide a purely hydraulic control type control apparatus, the structure of which is simple, in which down-shift is prohibited until a vehicle speed is decreased to a value not higher than a predetermined value so as to prohibit an engine from overrunning.

In order to solve the above problems, the present invention provides a control apparatus of a hydraulically operated vehicular transmission having at least two speed gears including a low speed gear and a high speed gear, comprising: a first hydraulic signal output means for outputting a first hydraulic signal according to an engine load; a second hydraulic signal output means for outputting a second hydraulic signal according to a vehicle speed; a shift valve being switched between a low speed position at which a low speed stage is established and a high speed position at which a high speed stage is established, the shift valve being pushed onto the low speed position side by the first hydraulic signal and an energizing means, the shift valve being pushed onto the high speed position side by the second hydraulic signal; and a down-shift means for changing over the shift valve to the low speed position by stopping the input of the second hydraulic signal into the shift vale when an operator conducts a down-shift operation, the down-shift means including a control valve arranged in a hydraulic oil path for inputting the second hydraulic signal into the shift valve, the control valve having: an input port communicated with an upper stream section of the hydraulic oil path; an output port communicated with an down stream section of the hydraulic oil path; a drain port; and a spool being changeable over between an opening position for connecting the input port with the output port and a closing position for cutting the connection and connecting the output port with the drain port, the down-shift means further including a third hydraulic signal output means for outputting a third hydraulic signal in the down-shift operation, wherein the control valve is provided with a first pressure chamber for pushing the spool onto the closing position side and a second pressure chamber for pushing the spool onto the opening position side, and the third hydraulic signal is inputted into the first pressure chamber and the second hydraulic signal is inputted into the second pressure chamber.

Even if the third hydraulic signal is inputted into the first pressure chamber by the operation of down-shift, the spool of the control valve is held at the opening position by the second hydraulic signal according to the vehicle speed inputted into the second pressure chamber when the vehicle is running at high speed. Further, the second hydraulic signal is inputted into the shift valve, so that the shift valve can be held at the high speed position. In this way, even when the driver conducts a down-shift operation in the process of high speed running, down-shift is prohibited and the engine is prevented from overrunning.

In this connection, after the spool of the control valve has been changed over to the closing position and down-shift has been carried out, in order to meet the demand of the operator who has conducted the down-shift operation, it is desired that the spool of the control valve is held at the closing position even when the vehicle speed is raised so that the gear can be prevented from being shifted up. In this case, when the second pressure chamber is communicated with a downstream section of the hydraulic oil path, the second pressure chamber is connected with a drain port by changing over the spool of the control valve to the closing position. Therefore, even if the vehicle speed is raised after that, the spool of the control valve can be held at the closing position by the third hydraulic signal inputted into the first pressure chamber, so that the gear can be prevented from being shifted up.

Further, even when the spool of the control valve has a communicating path for communicating a land groove of the spool, which connects the input port with the output port at the opening position and also connects the output port with the drain port at the closing position, with the second pressure chamber, the spool can be held at the closing position even if the vehicle speed is raised after the spool has been changed over to the closing position, and the gear is prevented from being shifted up. In this case, it is unnecessary to provide an external hydraulic oil path for inputting the second hydraulic signal into the second pressure chamber. Therefore, the structure of the hydraulic circuit can be simplified.

DETAILED DESCRIPTION OF THE PREFERRED EMBODIMENTS

Figure 1:
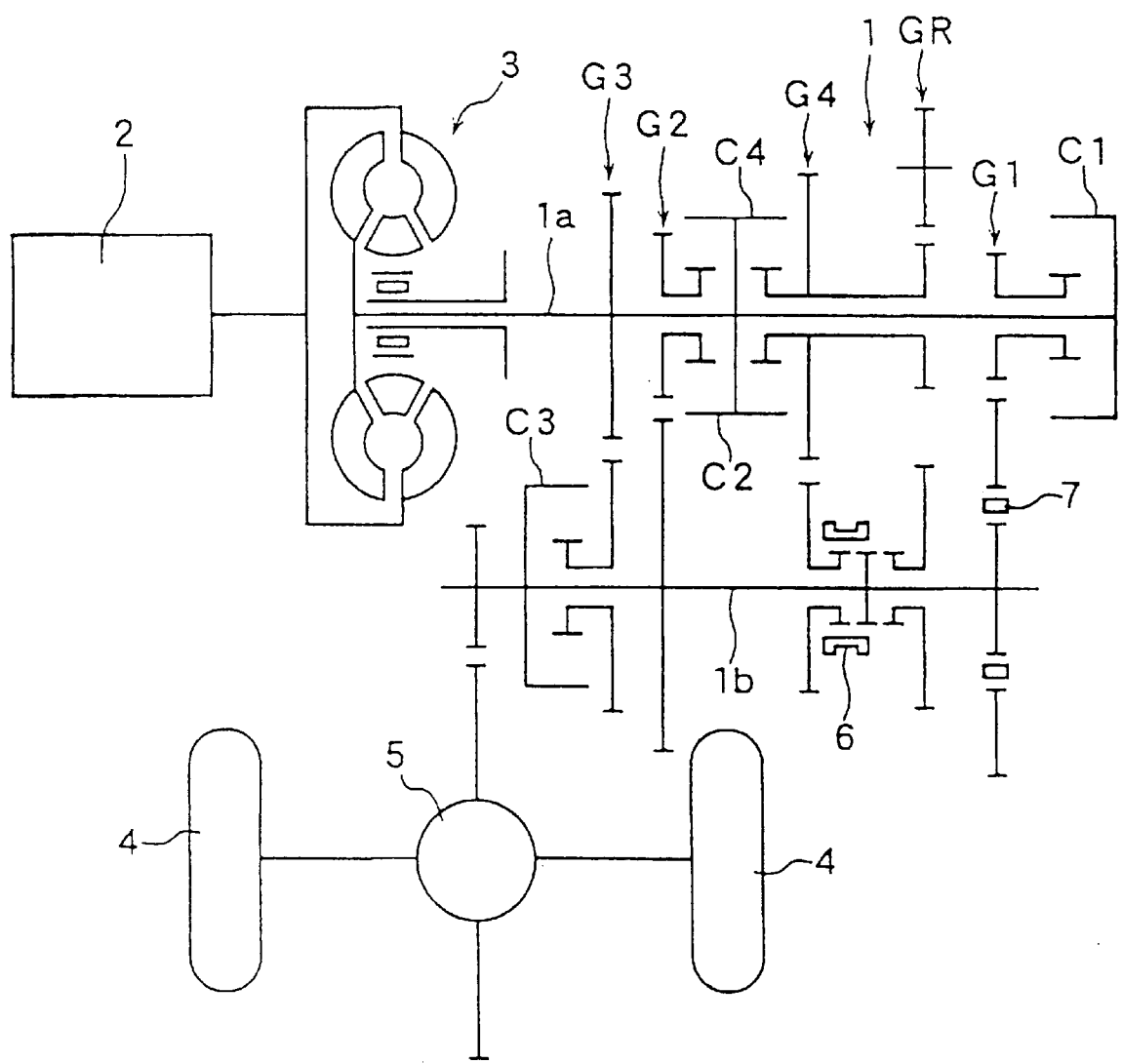
FIG. 1 is a skeleton diagram of an example of a transmission to which the present invention is applied.

Referring to FIG. 1, reference numeral 1 is a transmission of four-speed gear for advance and one-speed gear for reverse. The transmission 1 is provided with advance gear stages G1, G2, G3 and G4 and reverse gear stage GR which are arranged between an input shaft 1a connected with an engine 2 via a torque converter 3 and an output shaft 1b connected with drive wheels 4 of the vehicle via a differential gear 5. Hydraulic clutches C1, C2, C3 and C4, which are hydraulic connecting components respectively used for the first to the fourth speed, are intervened in the advance gear change stages G1, G2, G3 and G4.

In this connection, reverse gear change stage GR shares fourth speed hydraulic clutch C4 with fourth speed change stage G4. Therefore, fourth speed gear change stage G4 and reverse gear change stage GR are selectively established via a selector 6 arranged on the output shaft 1b. In the first speed gear change stage G1, there is provided a one-way clutch 7 which allows the output shaft 1b to overrun.

Figure 2:
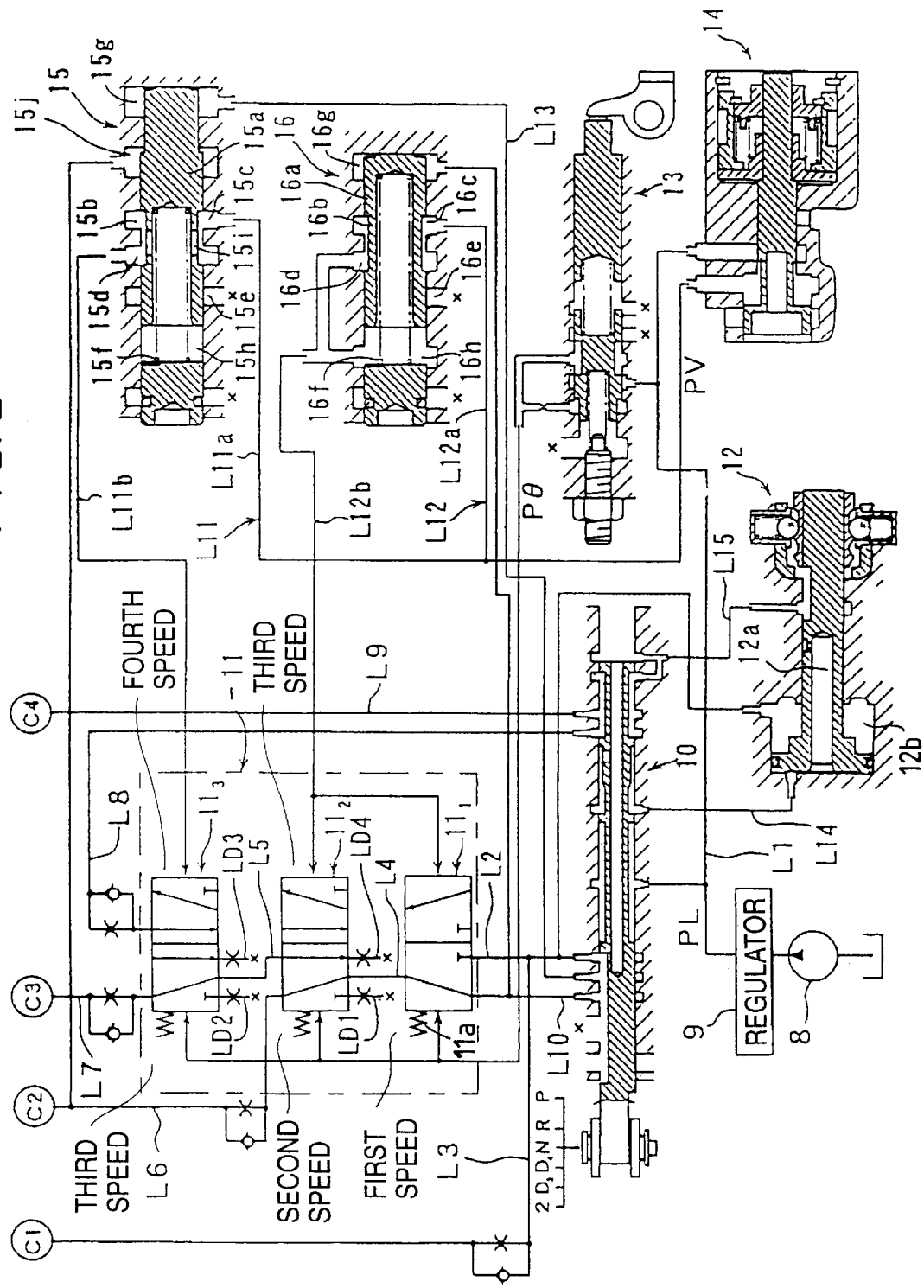
FIG. 2 is a hydraulic circuit diagram of the transmission to which the present invention is applied.

Hydraulic clutches C1, C2, C3 and C4 are controlled by a hydraulic circuit shown in FIG. 2 when quantities of hydraulic oil to be fed and discharged are controlled. In this hydraulic circuit, there are provided a hydraulic source 8, regulator 9, manual valve 10, shift valve unit 11 and servo valve 12 for changing over between the advance and the reverse by connecting the selector 6.

The manual valve 10 can be freely changed over among six positions of "P" for parking, "R" for the reverse operation, "N" for the neutral, "$D_4$" for automatic speed change conducted between the first and the fourth speed, "$D_3$" for automatic speed change conducted between the first and the third speed, and "2" for holding the second speed. At position "$D_4$", first hydraulic oil path L1 for supplying hydraulic oil, which has been sent from the hydraulic source 8 after the hydraulic pressure has been adjusted to constant line pressure PL by the regulator 9, is connected to second hydraulic oil path L2 which continues to a shaft valve unit 11. Hydraulic oil is selectively fed to second to fourth hydraulic clutch C2, C3 and C4 via the shift valve unit 11. Hydraulic oil is always fed to first speed hydraulic clutch C1 via third hydraulic oil path L3 which branches from second hydraulic oil path L2. Here, the manual valve 10 of FIG. 2 is positioned in "N" for the neutral.

The shift valve unit 11 includes: 1–2 shift valve $11_1$ arranged on the upstream side; 2–3 intermediate shift valve $11_2$ connected with 1–2 shift valve $11_1$ via fourth hydraulic oil path L4; and 3–4 shift valve $11_3$ arranged on the downstream side connected with 2–3 intermediate shift valve $11_2$ via fifth hydraulic oil path L5. In order to control to change over these shift valves $11_1$, $11_2$, $11_3$ according to the engine load and vehicle speed, there is provided a throttle valve 13 which is a first hydraulic signal output means for outputting a first hydraulic signal (described as throttle pressure Pθ hereinafter) according to the degree of throttle opening which corresponds to the engine load, and also there is provided a governor valve 14 which is a second hydraulic signal output means for outputting a second hydraulic signal (described as governor pressure PV hereinafter) according to the vehicle speed. The shift valves $11_1$, $11_2$, $11_3$ are pushed onto the low speed position side by throttle pressure Pθ and an energizing means 11a, and also pushed onto the high speed position side by governor pressure PV.

In case of the start at position "$D_4$", first, hydraulic oil is supplied to first speed hydraulic clutch C1, and first speed stage G1 is established. After that, when the vehicle speed is raised, 1–2 shift valve $11_1$ is changed over by governor pressure PV from the first speed position, which is a low speed position, to the second speed position, which is a high speed position, and second hydraulic oil path L2 is connected with fourth hydraulic oil path L4. Therefore, hydraulic oil is supplied to second speed hydraulic clutch C2 via sixth hydraulic oil path L6 on the discharging side of 2–3 shift valve $11_2$. Thus, the gear is shifted up from the first speed to the second speed. When the vehicle speed is further raised, 2–3 shift valve $11_2$ is changed over from the second speed position, which is a low speed position, to the third speed position, which is a high speed position, and fourth hydraulic oil path L4 is connected with fifth hydraulic oil path L5. Therefore, hydraulic oil is supplied to third speed hydraulic clutch C3 via seventh hydraulic oil path L7 arranged on the discharging side of third shift valve $11_3$. At the same time, sixth hydraulic oil path L6 is connected with first hydraulic oil discharging path LD1 via 2–3 shift valve $11_2$, and hydraulic oil is discharged from second speed hydraulic clutch C2, so that the gear is shifted up from the second speed to the third speed. When the vehicle speed is further raised, 3–4 shift valve $11_3$ is changed over from the third speed position, which is a low speed position, to the fourth speed position, which is a high speed position, and fifth hydraulic oil path L5 is connected with eighth hydraulic oil path L8. Therefore, hydraulic oil is supplied to fourth speed hydraulic clutch C4 via ninth hydraulic oil path L9 which is connected with eighth hydraulic oil path L8 at position "$D_4$". At the same time, seventh hydraulic oil path L7 is connected with second hydraulic oil discharging path LD2 via 3–4 shift valve $11_3$, so that hydraulic oil is discharged from third speed hydraulic clutch C4, and the gear can be shifted up from the third speed to the fourth speed.

Figure 3:
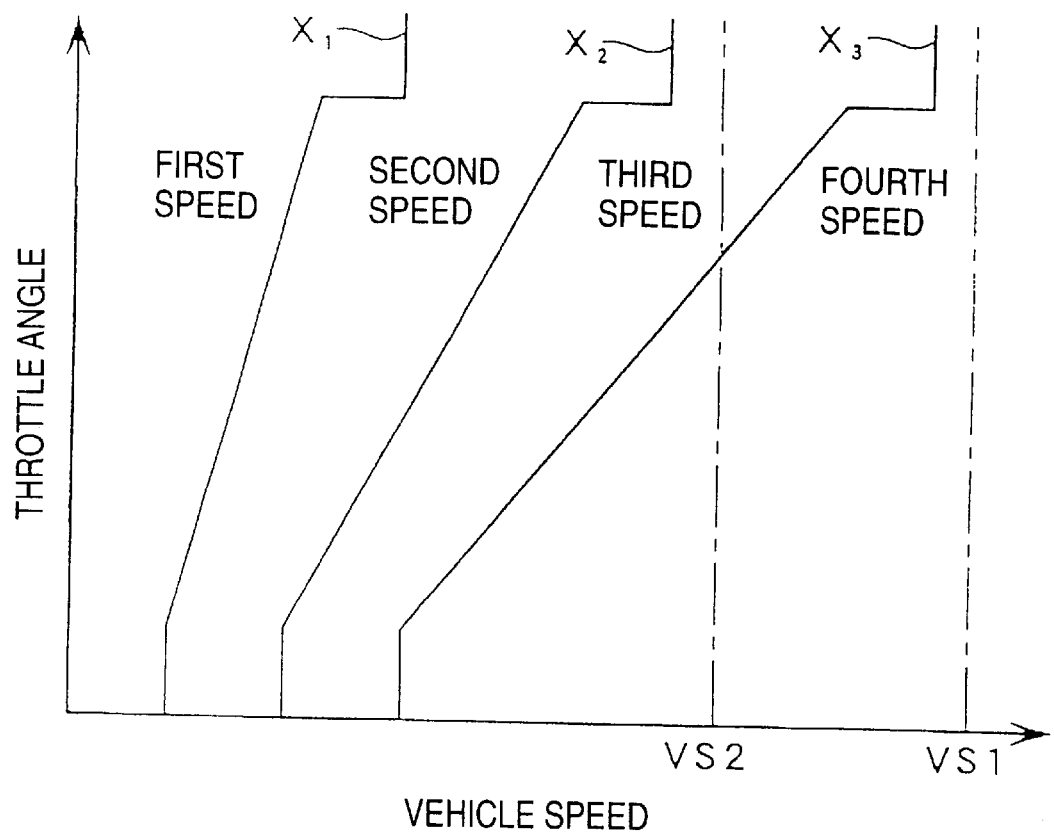
FIG. 3 is a diagram of the speed change characteristic.

When the speed is decreased, 3–4 shift valve $11_3$ is returned to the third speed position, and hydraulic oil is supplied to third speed hydraulic clutch C3 by the same route as that described above. At the same time, eighth hydraulic oil path L8 is connected with third hydraulic oil discharging path LD3 via 3–4 shift valve $11_3$, so that hydraulic oil is discharged from fourth hydraulic clutch C4 and the gear is shifted down from the fourth speed to the third speed. When the vehicle speed is further decreased, 2–3 shift valve $11_2$ is returned to the second speed position, and hydraulic oil is supplied to second speed hydraulic clutch C2 by the same route as that described above. At the same time, fifth hydraulic oil path L5 is connected with fourth hydraulic oil discharging path LD4 via 2–3 shift valve $11_2$, so that hydraulic oil is discharged from third speed hydraulic clutch C3, and the gear is shifted down from the third speed to the second speed. When the vehicle speed is further decreased, 1–2 shift valve $11_1$ is returned to the first speed position, and fourth hydraulic oil path L4 is connected with tenth hydraulic oil path L10, which is open to the atmosphere at position "$D_4$", via 1–2 shift valve $11_1$. Therefore, hydraulic oil is discharged from second speed hydraulic clutch C2, and the gear is shifted down from the second speed to the first speed. In this way, speed is automatically changed from the first to the fourth speed according to the speed change characteristic shown in FIG. 3. In the drawing, $X_1$, $X_2$ and $X_3$ respectively show speed change characteristic curves of the first speed to the second speed, the second speed to the third speed, and the third speed to the fourth speed.

In eleventh hydraulic oil path L11 through which governor pressure PV of the governor valve 14 is inputted into 3–4 shift valve $11_3$, there is provided a first control valve 15 which is a down-shift means for stopping the input of governor pressure PV into 3–4 shift valve $11_3$ at position "$D_3$" and holding 3–4 shift valve $11_3$ at the third speed position. In twelfth hydraulic oil path L12 for inputting governor pressure PV into 1–2 shift valve $11_1$ and 2–3 shift valve $11_2$, there is provided a second control valve 16 which is a down-shift means for stopping the input of governor pressure PV into 1–2 shift valve $11_1$ and 2–3 shift valve $11_2$ at the position "2" and holding 1–2 shift valve $11_1$ at the first speed position and 2–3 shift valve $11_2$ at the second speed position.

The first control valve 15 and the second control valve 16 respectively have spools 15a and 16a which can be changed over between the opening position located on the right and the closing position located on the left in FIG. 2. At the opening position, by the land grooves 15b, 16b formed in the spools 15a, 16a, the input ports 15c, 16c communicated with upstream sections L11a, L12a of eleventh hydraulic oil path L11 and twelfth hydraulic oil path L12 are respectively connected with the output ports 15d, 16d communicated with downstream sections L11b, L12b of eleventh hydraulic oil path L11 and twelfth hydraulic oil path L12. At the closing position, the input ports 15c, 16c are disconnected from the output ports 15d, 16d, and the output ports 15d, 16d are connected with the drain ports 15e, 16e. The spools 15a, 16a are pushed to the opening position side by the springs 15f, 16f. At position "$D_4$", the spools 15a, 16a are held at the opening position, and governor pressure PV is inputted into the shift valves $11_1$, $11_2$, $11_3$. Due to the foregoing, the shift valves $11_1$, $11_2$, $11_3$ are changed over according to speed change characteristic curves $X_1$, $X_2$ and $X_3$, so that the first to the fourth speed can be automatically changed.

In the control valves 15, 16, there are provided first pressure chambers 15g, 16g, which are located at the right end, for pushing the spools 15a, 16a onto the closing position side. At position "$D_3$", thirteenth hydraulic oil path L13 communicated with the first pressure chamber 15g of the first control valve 15 is connected with first hydraulic oil path L1 together with the second hydraulic oil path L2. The first pressure chamber 16g of the second control valve 16 is communicated with tenth hydraulic oil path L10. At position "2", tenth hydraulic oil path L10 is connected with first hydraulic oil path L1 together with second hydraulic oil path L2 and thirteenth hydraulic oil path L13. The manually operated valve 10 functions as the third hydraulic signal outputting means, and line pressure signal PL, which is a third hydraulic signal, is inputted into the first pressure chamber 15g of the first control valve 15 at position $D_3$. Therefore, the spool 15a is changed over to the closing position, and the input of governor pressure PV into 3–4 shift valve $11_3$ is stopped. At position "2", line pressure PL, which is a third hydraulic signal, is inputted into the first pressure chamber 16g of the second control valve 16, and the spool 16a is changed over to the closing position, so that the input of governor pressure PV into 1–2 shift valve $11_1$ and 2–3 shift valve $11_2$ can be stopped. In this connection, at position "2", even when 1–2 shift valve $11_1$ is located at the first speed position, hydraulic oil is supplied from tenth hydraulic oil path L10 to second speed hydraulic clutch C2, so that second speed stage G2 can be established.

In the control valves 15, 16, there are provided second pressure chambers 15h, 16h, which are located at the left end, for pushing the spools 15a, 16a onto the opening position side, and governor pressure PV is inputted into the second pressure chambers 15h, 16h. Even when line pressure PL is inputted into the first pressure chambers 15g, 16g, at high vehicle speed, since governor pressure PV is high, a pushing force generated by governor pressure PV and the springs 15f, 16f onto the opening position side becomes higher than a pushing force of line pressure PL onto the closing position side. Therefore, the spools 15a, 16a are not changed over to the closing position until the vehicle speed is decreased to a value not higher than a predetermined value. In the first control valve 15, this predetermined value is set at VS1 which is located on a somewhat higher speed side than the third speed to the fourth speed change characteristic curve shown in FIG. 3. In the second control valve 16, this predetermined value is set at VS2 which is located on a somewhat higher speed side than the second speed to the third speed change characteristic curve shown in FIG. 3. When the gear is changed over to position "$D_3$" while the vehicle is running at higher speed than VS1, down-shift is conducted from the fourth speed to the third speed at the point of time when the vehicle speed is decreased to VS1. When the gear is changed over to position "2" while the vehicle is running at higher speed than VS2, down-shift is conducted from the third speed to the second speed at the point of time when the vehicle speed is decreased to VS2. In this way, the engine 2 can be prevented from overrunning.

After the spools 15a, 16a of the control valves 15, 16 have been once changed over to the closing position, in order to respond to the intention of a driver who has conducted changeover operation to position "$D_3$"or "2", it is preferable that the spools 15a, 16a are kept at the closing position even when the vehicle speed is raised to a value not lower than VS1 or VS2. Therefore, this embodiment is composed in such a manner that the second pressure chamber 16h of the second control valve 16 is communicated with downstream section L12b of twelfth hydraulic oil path L12, and governor pressure PV is inputted into the second pressure chamber 16h only when the spool 16a is located at the opening position. In the first control valve 15, the second pressure chamber 15h is communicated with the land groove 15b via the communicating path 15i of an hydraulic oil hole formed in the spool 15a. Also, in this case, only when the spool 15a is located at the opening position, governor pressure PV is inputted into the second pressure chamber 15h, and when the spool 15a is once changed over to the closing position, the spool 15a can be kept at the closing position as long as line pressure PL is inputted into the first pressure chamber 15g even if the vehicle speed is raised. In the second control valve 16, it is necessary to provide an external hydraulic oil path for communicating the second pressure chamber 16h with the downstream section of twelfth hydraulic oil path L12. However, in the first control valve 15, it is unnecessary to provide this external hydraulic oil path. Therefore, the hydraulic oil path structure can be simplified.

In this embodiment, in the first control valve 15, there is provided a third pressure chamber 15j for pushing the spool 15a onto the closing position side. Hydraulic pressure of second speed hydraulic clutch C2 is inputted into the third pressure chamber 15j, so that the spool 15a can be changed over to the closing position when the vehicle is running at the second speed. Therefore, in case that the vehicle is running at position "$D_4$", even when jumping up-shift operation from the second speed to the fourth speed is conducted by returning the accelerator pedal, 3–4 shift valve $11_3$ is held at the third speed position with the stop of input of governor pressure PV until the spool 15a is changed over to the opening position when hydraulic pressure is decreased to a predetermined value because hydraulic oil is discharged from second speed hydraulic clutch C2. Therefore, up-shift operation to the fourth speed can be smoothly conducted via the third speed.

At position "R", fourteenth hydraulic oil path L14 on the input side of the servo valve 12 is connected with first hydraulic oil path L1, and at the same time ninth hydraulic oil path L9 communicating with fourth speed hydraulic clutch C4 is connected with fifteenth hydraulic oil path L15 on the output side of the servo valve 12. Then, the servo valve 12 is changed over to the reverse position, which is located on the right in the drawing, by hydraulic oil pressure of fourteenth hydraulic oil path L14, and reverse stage GR is connected with the output shaft 1b via the selector 6. At the same time, at the reverse position, fourteenth hydraulic oil path L14 is connected with fifteenth hydraulic oil path L15 via the oil hole 12a formed in the servo valve 12, and hydraulic oil is supplied to fourth speed hydraulic clutch C4 so that reverse stage GR can be established.

At positions "$D_4$", "$D_3$" and "2", hydraulic pressure is inputted from second hydraulic oil path L2 into the back pressure chamber 12b of the servo valve 12. Therefore, the servo valve 12 is changed over to the advance position (shown in FIG. 2) on the left. In this way, fourth speed stage G4 is connected with the output shaft 1b via the selector 6.

In the above explanations, the present invention is applied to an embodiment including a transmission of a two parallel shaft type. However, the present invention is not limited to the specific embodiment, but it is possible to apply the present invention to a control apparatus of a transmission of a planetary gear type.

As can be seen in the above explanations, according to the present invention, even in a purely hydraulic control type control apparatus using a shift valve which is changed over by a hydraulic signal according to an engine load and a hydraulic signal according to a vehicle speed, it is possible to prohibit down-shift of the transmission until the vehicle speed is decreased to a value not higher than a predetermined value when a driver conducts down-shift operation. Therefore, it is possible to prevent an engine from overrunning due to the down-shift when a vehicle is running at high speed.

The present disclosure relates to the subject matter contained in Japanese patent application No. Hei-10-133511 filed on May 15, 1998 which is expressly incorporated herein by reference in its entirety.

What is claimed is:

1. A control apparatus of a hydraulically operated vehicular transmission having at least two speed gears including a low speed gear and a high speed gear, comprising:

a first hydraulic signal output means for outputting a first hydraulic signal according to an engine load;

a second hydraulic signal output means for outputting a second hydraulic signal according to a vehicle speed;

a shift valve being switched between a low speed position at which a low speed stage is established and a high speed position at which a high speed stage is established, the shift valve being pushed onto the low speed position side by the first hydraulic signal and an energizing means, the shift valve being pushed onto the high speed position side by the second hydraulic signal; and a down-shift means for changing over the shift valve to the low speed position by stopping the input of the second hydraulic signal into the shift vale when an operator conducts a down-shift operation, the down-shift means including a control valve arranged in a hydraulic oil path for inputting the second hydraulic signal into the shift valve, the control valve having:

an input port communicated with an upper stream section of the hydraulic oil path;

an output port communicated with a downstream section of the hydraulic oil path;

a drain port; and a spool being changeable over between an opening position for connecting the input port with the output port and a closing position for cutting the connection and connecting the output port with the drain port, the down-shift means further including a third hydraulic signal output means for outputting a third hydraulic signal in the down-shift operation, wherein the control valve is provided with a first pressure chamber for pushing the spool onto the closing position side and a second pressure chamber for pushing the spool onto the opening position side, and the third hydraulic signal is inputted into the first pressure chamber and the second hydraulic signal is inputted into the second pressure chamber.

2. A control apparatus of a hydraulically operated vehicular transmission according to claim 1, wherein the second pressure chamber is communicated with the downstream section of the hydraulic oil path.

3. A control apparatus of a hydraulically operated vehicular transmission according to claim 1, wherein the spool of the control valve is formed with a land groove connecting the input port with the output port at the opening position and connecting the output port with the drain port at the closing position, and a communicating path communicating the land groove with the second pressure chamber.

* * * * *